United States Patent [19]

Hazlitt

[11] 4,097,017
[45] Jun. 27, 1978

[54] FISHING ROD HOLDING DEVICE

[76] Inventor: William H. Hazlitt, 112 "C" St., Pacheco, Calif. 94553

[21] Appl. No.: 687,521

[22] Filed: May 18, 1976

Related U.S. Application Data

[63] Continuation-in-part of Ser. No. 550,772, Feb. 18, 1975, abandoned.

[51] Int. Cl.² .............................................. A45B 25/28
[52] U.S. Cl. .................................... 248/515; 248/538; 403/117
[58] Field of Search ........ 248/511, 514, 515, 519–521, 248/530, 533–535, 538, 185, 186, 291; 403/112, 113, 117

[56] References Cited

U.S. PATENT DOCUMENTS

| 1,394,863 | 10/1921 | Reynolds | 403/113 |
| 2,341,065 | 2/1944 | White | 248/515 |
| 2,845,317 | 7/1958 | Orman | 403/113 X |
| 2,851,234 | 9/1958 | Scheifele | 248/538 |
| 3,000,599 | 9/1961 | Honig | 248/515 |
| 3,259,346 | 7/1966 | Rogers | 248/538 X |
| 3,309,808 | 3/1967 | George | 248/533 X |
| 3,319,911 | 5/1967 | Fuller | 248/514 |
| 3,491,397 | 1/1970 | Hesener | 403/117 X |
| 3,570,793 | 3/1971 | Shackel | 248/515 |
| 3,708,141 | 1/1973 | Friedgen et al. | 248/515 |

FOREIGN PATENT DOCUMENTS

| 1,379,222 | 10/1964 | France | 403/117 |

Primary Examiner—Lawrence J. Staab
Attorney, Agent, or Firm—Bielen and Peterson

[57] ABSTRACT

A device for maintaining a fishing rod in a preselected location, while permitting free pivotal movement of the rod, to a limited extent, in both horizontal and vertical planes. A further feature of the device resides in the fact that the rod can be instantly released from the holder merely by lifting it by the handle out of contact therewith.

3 Claims, 11 Drawing Figures

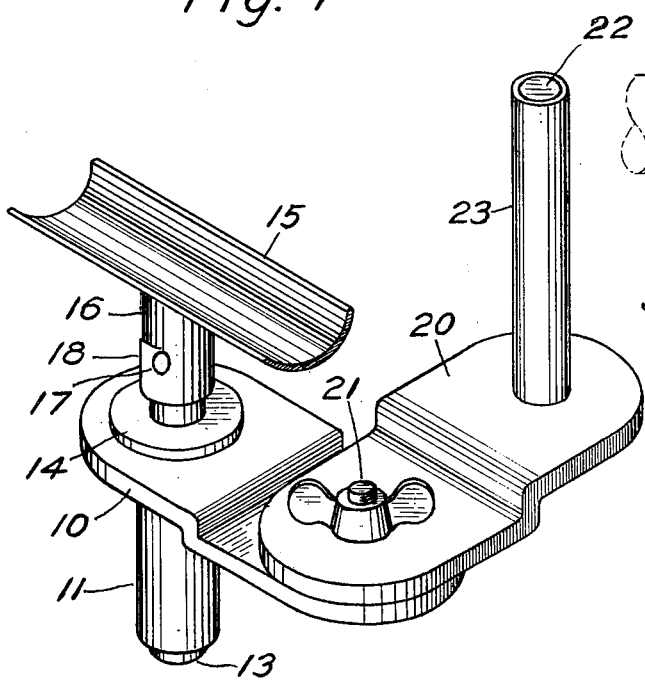
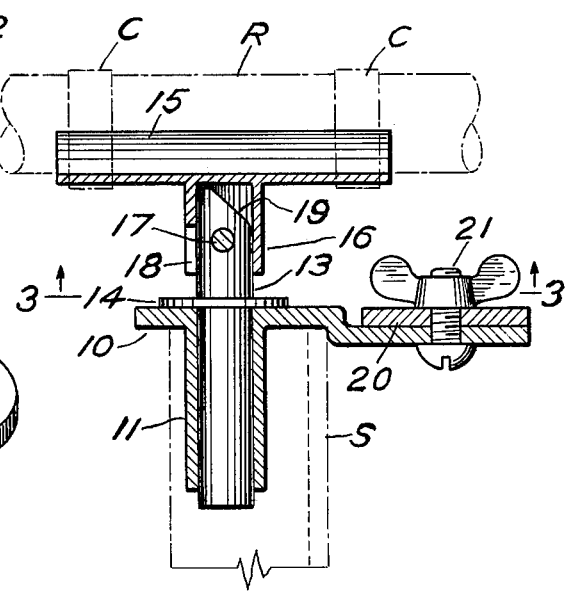
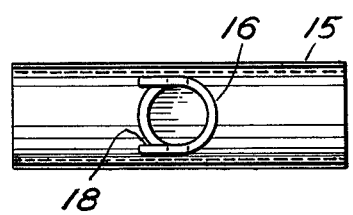
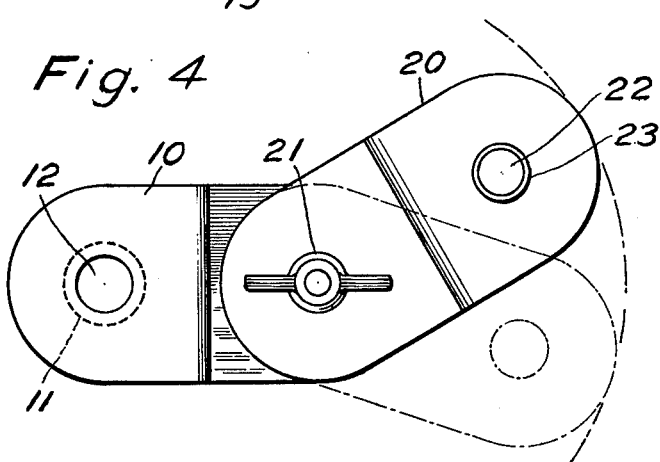
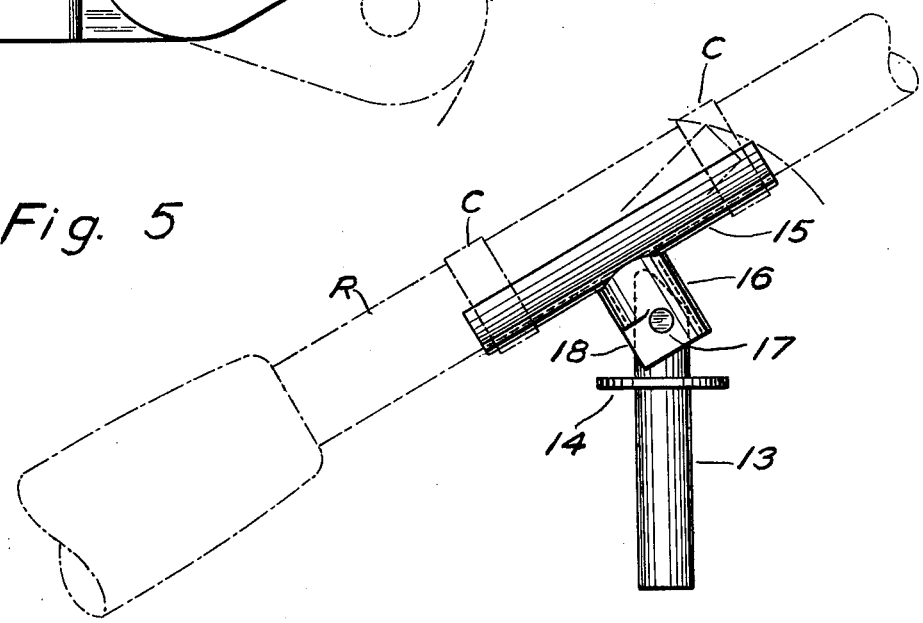

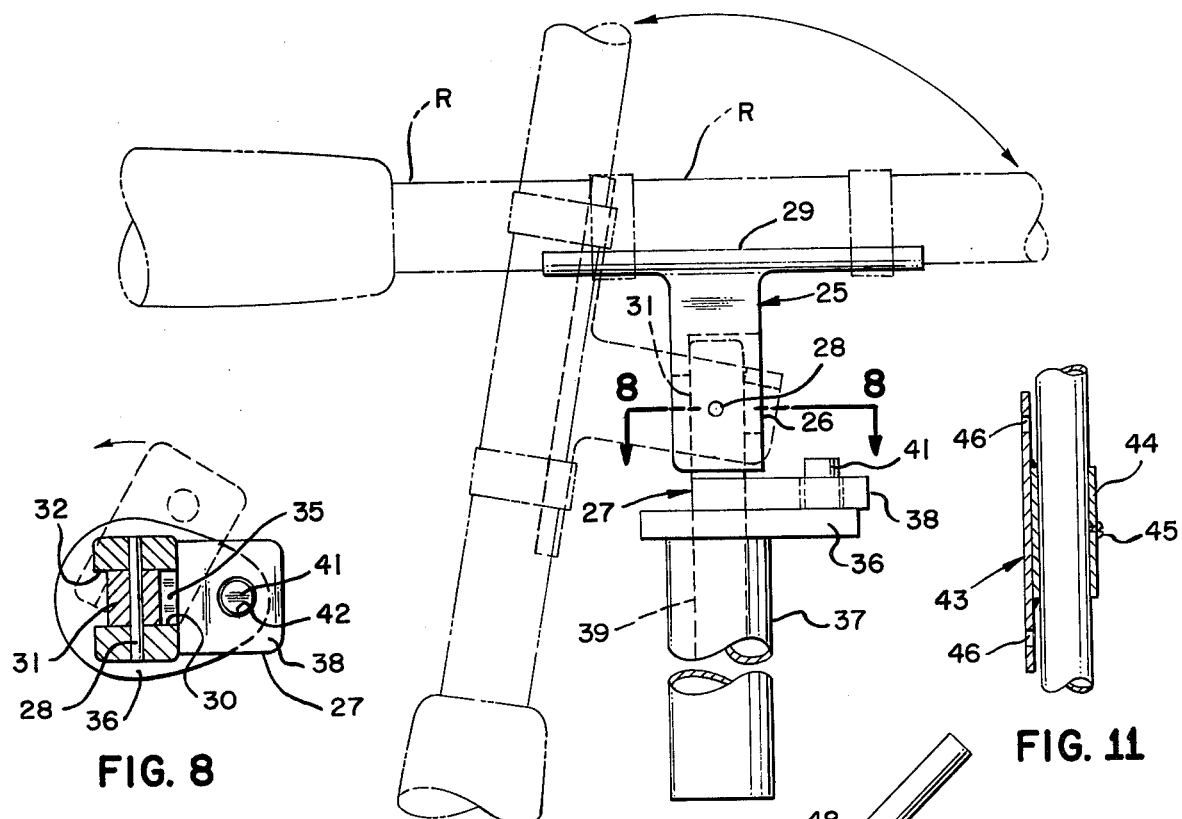
FIG. 6
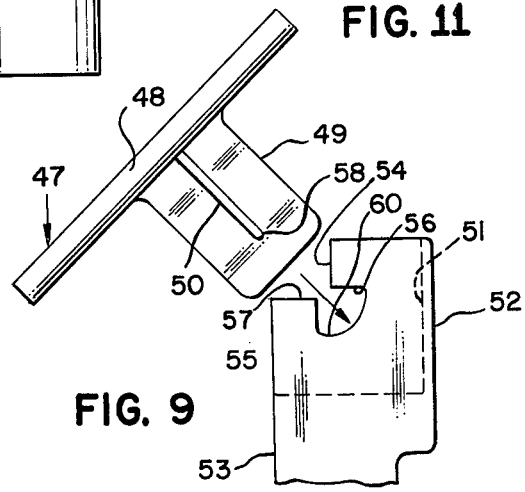
FIG. 11
FIG. 9
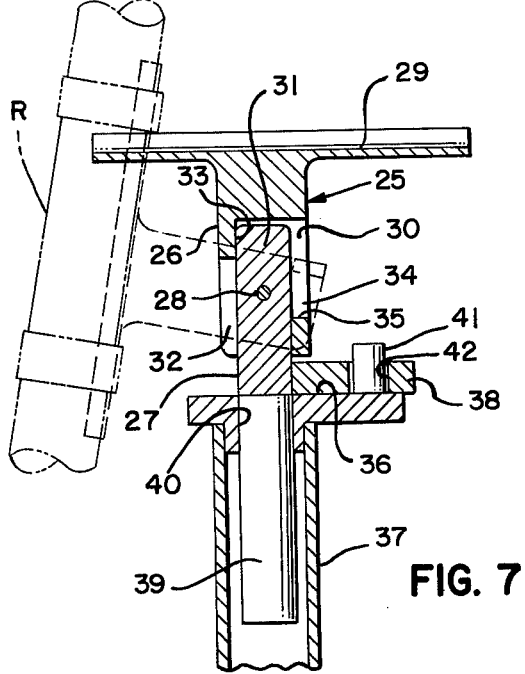
FIG. 8
FIG. 7
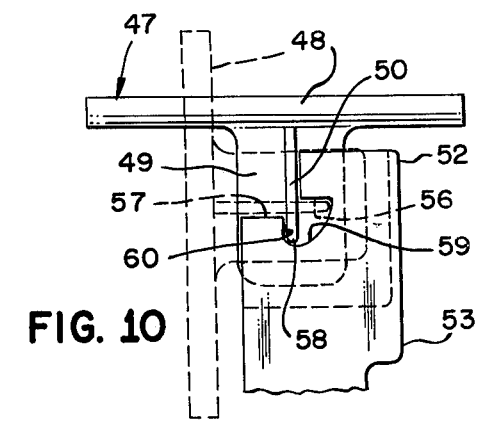
FIG. 10

FISHING ROD HOLDING DEVICE

CROSS REFERENCES TO RELATED APPLICATIONS

This application is a continuation-in-part of my application, Ser. No. 550,772, entitled "FISHING ROD HOLDER", filed 18 Feb. 1975, and now abandoned.

BRIEF SUMMARY OF THE INVENTION

The object of the present invention is the provision of a holder which can be secured in any desired location, such as a river bank, a pier or dock, or any floating craft, by conventional means such as stakes or clamps.

It is a further object of the invention to provide a holder which is free to pivot in the manner of a universal joint whereby an automatic correction will take place to counteract any tendency for slack to develop in the line.

A still further object of the invention is the provision of a holder which will allow a delicate balancing of the rod whereby automatic pivotal movement thereof will afford correction of a line which is being subjected to the action of incoming and outgoing surf. This feature will also dampen any adverse action resulting from the rocking of a boat to which the holder may be attached.

It is a further object of the invention to provide a holder from which a rod can be released by merely lifting it out of contact therewith.

These and other object of the invention will become apparent during the course of the following description and appended claims, taken in connection with the accompanying drawing forming a part hereof.

BRIEF DESCRIPTION OF THE DRAWINGS

FIG. 1 is a perspective view of a preferred embodiment of the rod holder.

FIG. 2 is a vertical, transverse section taken through a median line of the fixed support bracket of the assembly shown on FIG. 1.

FIG. 3 is a view of the rod-supporting cradle as seen from line 3—3 on FIG. 2.

FIG. 4 is a plan view of a sub-assembly comprising the fixed support bracket and the adjustable stop bracket.

FIG. 5 is an elevation of a sub-assembly illustrating the pivotal connection between the rod-supporting cradle and the horizontal pivot pin.

FIG. 6 is a side elevational view of an alternate embodiment of the fishing rod holder.

FIG. 7 is a cross sectional view of the embodiment of the fishing rod holder of FIG. 6.

FIG. 8 is a cross sectional view of the fishing rod holder taken on the lines 8—8 in FIG. 6.

FIG. 9 is an exploded side elevational view of a further alternate embodiment of the fishing rod holder.

FIG. 10 is a side elevational view of the embodiment of the fishing rod holder of FIG. 9.

FIG. 11 is a cross sectional view of a bracket adapted to cooperate with the above embodiments of the fishing rod holder.

DESCRIPTION OF THE PREFERRED EMBODIMENTS

Referring to the drawing in detail in which conventional elements not forming part of the invention, have been indicated in phantom, a fixed support bracket 10 is illustrated as consisting of a rectangular plate having rounded ends, and being offset near the center of its length. The form of the plate, however, is as indicated, merely for esthetic and rigidity of construction reasons, and is not to be considered as being restrictive to any degree.

A tubular member 11 depends from the underside of the bracket 10 at one end thereof, and an aperture 12, complementary to, and in alignment with the inner diameter of the tubular member is provided in the end of the bracket 10, as can most clearly be seen on FIG. 2. A pivot pin 13 is adapted to be contained within the tubular member 11. This pin is provided with a concentric collar or flange 14 which acts as a stop whereby the position of the pin, at assembly is fixed. In its assembled position, the pin 13 is free to rotate within the tubular member 14, and can be removed therefrom simply by lifting it out.

The upper end of the horizontal pivot pin 13, the term horizontal being used to define the plane of the pivotal action rather than the actual alignment of the pin itself, is adapted to have pivotally mounted thereon a rod-support cradle 15. This support cradle consists of a member of arcuate, transverse cross sectional form, having its concave side facing upwardly, and being provided with a depending member 16, of relatively short length, as can be seen on FIG. 2. A pin 17, completes the aforesaid pivotal mounting.

With further reference to FIG. 2, it will be noted that, with the cradle 15 in a horizontal position as indicated, no further rotation in a clockwise direction is possible. Rotation in the opposite direction, however, can be effected because, at the lower end thereof, the member 16 has been split for a portion of its length, and has been formed in a U-shaped section 18, as shown on FIG. 3. This arrangement permits the pin 13 and the cradle 15 to assume positions of angular relationship from that indicated on FIG. 2 up to and slightly beyond that indicated on FIG. 5. The limit of rotation in the counterclockwise direction is established by the beveled upper end 19, of the pin 13.

A stop bracket 20, of similar form to that of bracket 10, is pivotally attached thereby by any suitable means such as the screw and wing nut 21, as indicated. This arrangement enables the brackets to be locked together in any desired angular relationship within the limits of the swing of the bracket 20. This is clearly illustrated in FIG. 4. Extending upwardly from the free end of bracket 20, is a stop pin 22, adapted to limit horizontal rotation of the rod in direction determined by the alignment of the brackets 20 and 10. The pin 22 is preferably furnished with an outer sleeve 23, of rubber or other suitable material, to prevent marring of the surface of the rod where it comes into contact with the stop.

In use, the holder is anchored in place at the water's edge, by means of any suitable stake attached thereto, such as the angle S indicated in phantom on FIG. 2, or as previously stated, it can be attached to the side of a boat by any suitable means. A rod R is than secured in place in cradle 15 by clamps C as indicated. The position of the rod in the cradle should be selected such that a normal balance will allow the rod to automatically assume a position similar to that as indicated on FIG. 5, than if there is any current running, the stop pin is placed on the downstream side of the rod. Any surf action affecting the line, and which would otherwise cause slack in the line, will be corrected by vertical oscillations of the balanced rod. Also, if the holder is mounted on a boat, the effect of rocking of the boat, on the rod, will be minimized by the inertia of the rod which will virtually float on the pin 17.

It should be obvious from the foregoing that all conditions normally encountered in angling activities, of the type using such equipment, have been provided for. It should again be noted that the rod can be immediately removed from the holder when necessary, the attached parts, as indicated on FIG. 5, causing no inconvenience to the further activities of the angler.

In addition to the above described embodiment, the objectives of the fishing rod holder as outlined previously in the brief summary of the invention, may be accomplished by alternate embodiments without departing from the novel conceptual scope of this invention. For example, the embodiment shown in FIGS. 6, 7 and 8, provides a highly efficient and more compact unit for enabling the freely pivotly vertical movement within defined limits as described for the previous embodiment.

Referring to FIG. 6 and 7, a fishing rod illustrated in part in phantom and designated by the reference letter R is shown supported on and clamped to a cradle member 25 by conventional clamps C, also shown in phantom. The cradle member 25 has a depending neck 26 of relatively short length which is connected to a pivot unit 27 by a pivot pin 28. The construction and arrangement of the cradle member 25 and pivot unit 26 is such that the cradle member 25 is freely pivotal within a limited range such that the support surface 29 of the cradle member and hence the attached rod is pivotal from the substantially vertical position shown in dash line in FIGS. 6 and 7, here ten degrees from a true vertical, to the horizontal position primarily illustrated.

This is accomplished by a hollowed-out portion 30 of the depending neck 26 of the cradle member 25 into which is inserted a projecting head portion 31 of the pivot unit 27. On one side of the depending neck 26 is a U-shaped slot 32, which allows passage for the head portion 31 of the pivot unit 27 during pivot to a position approaching a vertical position. The slot 32 is short of the depth of the hollowed out portion such that a lip 33 at the base of the slot provides a contact stop for the top of the head portion 31 in the horizontal position and a contact stop for the lower side of the head portion in the near vertical position. On the opposite side of the depending neck 26 is a window aperture 34 allowing passage of the top of the head portion when the cradle member is pivoted from the near vertical position to the substantially horizontal position. A cross portion 35 at the bottom of the aperture 34 and depending neck 26 provides a contact stop for the lower side of the head portion when the cradle member is in the substantially horizontal position and a contact stop for the upper side of the head portion when the cradle member is in the substantially vertical position.

In this manner, when the cradle member is forcefully tipped to the horizontal position, for example from the surge of a hooked fish or forcefully tipped to the near vertical position, for example in setting a hook, no stresses of any substance are placed on the pivot pin because of the diametrically opposite stops on the cradle member.

Preferably for maintenance of good operating tolerances after long use, the head portion 31 of the pivot unit 27 is square in cross section as shown in FIG. 8. This forms a flat contact surface against the contact stops of the depending neck portion of the cradle member.

As mentioned hereinbefore, the depending neck 26 of the cradle member is of relatively short length. In this manner, a balance of the rod on the cradle, biased somewhat toward the near vertical position, is easily obtained. Were the length excessive, the point of pivot would be to far displaced from the center of gravity of a coupled rod and cradle member. The pivotal connection would thereby lack stability and result in improper operation for the manner of use contemplated.

The cradle member 25 and pin coupled pivot unit 27 are slidably engageable in a bearing plate 36 attached to a tubular extension member 37. The pivot unit 27 includes a small tab plate 38 projecting horizontally from the juncture of the head portion 31 and a depending journal pin portion 39. The tab plate 38 rests on the bearing plate 36, thereby providing support for the pivot unit and cradle member. The journal pin portion is insertable into a bearing sleeve or aperture 40 in the bearing plate 36 for generally free rotation therein. Rotation is restricted by a pin 41 on the bearing plate 36 which is insertable through a hole 42 in the tab plate 38 to inhibit rotation of the cradle member and pivot unit with respect to the bearing plate as shown in FIG. 8, or to provide limited rotation of the cradle member and pivot unit when the tab plate 36 is oriented away from the pin 41 as shown in dash line in FIG. 8. In this manner, the pin functions, respectively, either as a locking pin or a stop pin depending on the action desired. For example, if the fishing conditions are such that a fixed orientation of the rod with regard to rotation in the horizontal plane is desired, as in surf casing, the tubular extension and attached bearing plate can be oriented such that the pin engages the hole, eliminating the horizontal rotation action. If the conditions are such that a limited rotation is preferred as in anchored boat fishing with a transverse current, the tubular extension and bearing plate can be oriented such that the pin is arranged to contact the side of the tab plate within a desired range allowing a limited free rotation to occure to compensate for such movements as the boat drifting around the anchor point.

In either position, the cradle member and pivot unit are quickly removable from the bearing plate and extension member. This is necessary to allow the rod to be snatched from its support when hooking a fish or securing a hooked fish and reeling it in.

The tubular extension member may be employed to mount the attached components in a variety of manners. The extension may be simply driven into the ground for surf fishing or may be telescopically connected to a ground driven member (not shown) or may be supported by a bracket 43 with a sleeve section 44, as shown in FIG. 11. The extension member is slidably insertable into the sleeve section and secured in the desired position by a locking screw 45.

The bracket 43 includes mounting holes 46 for attaching the bracket with conventional fasteners (not shown) to a structure such as a boat gunwale (not shown).

Referring to FIGS. 9 and 10, a simple structure is shown which accomplishes the primary conceptual feature of this invention without the collateral features of the preferred embodiments described above.

Essentially, a cradle member 47 having a cradle portion 48 attachable to a rod (not shown) includes also a depending tab 49 with wing tabs 50 (one shown in FIGS. 9 and 10) projecting normally from the depending tab 49. The depending tab 49 is slidably insertable into a slot 51 in a flat head portion 52 of extension member 53, the flat head portion comprising the pivot member receiving the pivotal cradle member. The projecting wing tabs, which run from the cradle portion 48, a relatively short length, to a point short of the distal end of the depending tab 49, insert into a keyway 60 in the flat head portion 52 of the extension member 53. The keyway 60 is designed to limit the rotation movement of the cradle member 47 by stop surfaces 54 and 55 for substantially horizontal positioning of the cradle member 47 with respect to the extension member 53 and stop surfaces 56 and 57 for positioning of the cradle member to a position approaching the vertical, as shown in dash line in FIG. 10. Between these limits defined by the stop surfaces, the cradle member 47 is freely pivotal in the vertical plane. While the pivotal action is directed at the sliding interface of the ends 58 of the wing tabs 50 against the curved base 59 of the keyway, the action is similar to that of a pin having a central axis at the center of the imaginary axis about which the cradle member 47 is rotatable.

The extension member 53 shown fragmented in FIGS. 9 and 10 extends for a desired length and preferably has a transition from the flat head portion 52 to a tubular section (not shown) which may be mounted as described above for the previous embodiment.

While in the foregoing specification embodiments of the invention have been set forth in considerable detail for purposes of making a complete disclosure of the invention, it will be apparent to those skilled in the art that numerous changes may be made in such details without departing from the spirit and principles of the invention.

What is claimed is:

1. A fishing rod holder comprising:
   a. pivotal cradle member having an integral support element constructed to receive a fishing rod mounted thereto, and having an integral depending pivot element depending a relatively short length from the integral support element;
   b. a pivot mounting member connected to said depending pivot element of said cradle member, said pivot element of said cradle member and said pivot mounting member having cooperating pivot means for providing free rotation of said cradle member on said mounting member in a vertical plane within predefined limits; said means including first stop means for limiting orientation said support element of said cradle member at a substantially horizontal position and second stop means for limiting orientation of said support element of said cradle member at a position approaching a vertical position, said cradle member being freely rotatable between said stop means; and
   c. means for supporting said pivot mounting member to an ancillary means; wherein said cooperating pivot means includes a head portion having a receiving slot and a keyway; and, said depending pivot element has a depending tab with a distal end insertable in said receiving slot and has a pair of projecting wing tabs transverse to said depending tab, said wing tabs having ends short of the distal end of the depending tab, said ends engaging said keyway for pivot of said cradle member on said mounting member; and wherein said keyway has stop surfaces engageable with said wing tabs and limiting pivotal movement of said cradle member in said mounting member, said stop surfaces comprising said first and second stop means.

2. A fishing rod holder comprising:
   a. pivotal cradle member having an integral support element constructed to receive a fishing rod mounted thereto, and having an integral depending pivot element depending a relatively short length from the integral support element;
   b. a pivot mounting member connected to said depending pivot element of said cradle member, said pivot element of said cradle member and said pivot mounting member having cooperating pivot means for providing free rotation of said cradle member on said mounting member in a vertical plane within predefined limits, said means having a pivot pin about which said cradle member is rotated, and including first stop means for limiting orientation, of said support element of said cradle member at a substantially horizontal position, said first stop means having first and second contact surfaces on said depending pivot element and first and second contact surfaces on said mounting member, said first contact surfaces being generally diametrically opposite said second contact surfaces relative to said pivot pin, said first surfaces contacting and said second surfaces contacting in said substantially horizontal position, and second stop means for limiting orientation of said support element of said cradle member at a position approaching a vertical position, said cradle member being freely rotatable between said stop means, wherein said cooperating pivot means for providing free rotation of said cradle member in a vertical plane comprises a hollowed out portion in said pivot element of said cradle member, an upwardly projecting head element on said pivot mounting member inserted in said hollowed out portion, and a horizontally oriented pivot pin in said depending pivot element of said cradle member pivotally connected to said projecting head element of said pivot mounting member in said hollowed out portion, said projecting head element having sides with an upper portion and a lower portion, said hollowed out portion in said pivot element including walls, a slot with a base and a window aperture with a cross portion, said first stop means comprising the sides of the projecting head element and the walls of the hollowed out portion proximate the slot and window, and said second stop means comprising the upper portion of the sides of the head element and the cross portion of the window aperture, and the lower portion of the sides of the head element and the base of the slot; and,
   c. means for supporting said pivot mounting member to an ancillary means wherein said pivot mounting member includes a downwardly projecting pin element and said means for supporting said pivot member includes a bearing element into which said projecting pin element is slidably engageable, said projecting pin element and said bearing element being so constructed and arranged that said cradle member and connected pivot mounting member are freely rotatable in a horizontal plane, and are slidably removable from said means for supporting said pivot member.

3. The fishing rod holder of claim 2 wherein said pin element and said bearing element include cooperating stop means for limiting the free rotation in the horizontal plane.

* * * * *